(12) United States Patent
Marsh et al.

(10) Patent No.: US 11,769,410 B2
(45) Date of Patent: Sep. 26, 2023

(54) TECHNIQUES FOR SHARING SENSOR MESSAGES IN SIDELINK COMMUNICATIONS

(71) Applicant: QUALCOMM Incorporated, San Diego, CA (US)

(72) Inventors: Gene Wesley Marsh, San Diego, CA (US); Dan Vassilovski, Del Mar, CA (US); Shailesh Patil, San Diego, CA (US); Hong Cheng, Basking Ridge, NJ (US); Seung Ryul Yang, San Diego, CA (US); James Alan Misener, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/462,950

(22) Filed: Aug. 31, 2021

(65) Prior Publication Data

US 2022/0068136 A1 Mar. 3, 2022

Related U.S. Application Data

(60) Provisional application No. 63/073,394, filed on Sep. 1, 2020.

(51) Int. Cl.
*G08G 1/16* (2006.01)
*H04W 4/40* (2018.01)

(52) U.S. Cl.
CPC .............. *G08G 1/161* (2013.01); *H04W 4/40* (2018.02)

(58) Field of Classification Search
CPC ............ G08G 1/16; G08G 1/161; H04W 4/46
See application file for complete search history.

(56) References Cited

U.S. PATENT DOCUMENTS

| 2012/0022759 A1* | 1/2012 | Inoue | B60T 7/22 701/70 |
|---|---|---|---|
| 2018/0151077 A1* | 5/2018 | Lee | B60Q 9/008 |
| 2022/0126864 A1* | 4/2022 | Moustafa | G06T 9/00 |

OTHER PUBLICATIONS

International Search Report and Written Opinion—PCT/US2021/048713'ISA/EPO—dated Dec. 13, 2021.
Zhuang Y., et al., "Time and Location-Critical Emergency Message Dissemination for Vehicular Ad-Hoc Networks", IEEE Journal on Selected Areas in Communications, IEEE Service Center, Piscataway, US, vol. 29, No. 1, Jan. 1, 2011 (Jan. 1, 2011), pp. 187-196, XP011340859, ISSN: 0733-8716, DOI: 10.1109/JSAC.2011.110118 abstract, section I, section III. A., section IV.D., figure 1.

* cited by examiner

*Primary Examiner* — Benyam Haile
(74) *Attorney, Agent, or Firm* — Arent Fox, LLP

(57) ABSTRACT

Some aspects described herein relate to detecting, for a first vehicle, presence of an obstacle in a driving path of a vehicle, determining, for a second vehicle, a sight stopping distance between the second vehicle and the obstacle, and transmitting, to the second vehicle and where the sight stopping distance is within a threshold, a message including a notification of the obstacle.

30 Claims, 5 Drawing Sheets

TECHNIQUES FOR SHARING SENSOR MESSAGES IN SIDELINK COMMUNICATIONS

CLAIM OF PRIORITY UNDER 35 U.S.C. § 119

The present Application for Patent claims priority to Provisional Patent Application No. 63/073,394, entitled "TECHNIQUES FOR SHARING SENSOR MESSAGES IN SIDELINK COMMUNICATIONS" filed Sep. 1, 2020, which is assigned to the assignee hereof and hereby expressly incorporated by reference herein for all purposes.

BACKGROUND

Aspects of the present disclosure relate generally to wireless communication systems, and more particularly, to performing sidelink communications among devices.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate with a base station to receive access to a wireless network and can also communicate with other UEs over a sidelink channel. Sidelink communications can be used in vehicle-based communications, such as vehicle-to-vehicle (V2V), vehicle-to-infrastructure (V2I), etc., which are collectively referred to, in 5G NR, as vehicle-to-anything (V2X) communications. Vehicle-based UEs can be configured to convey basic safety messages (BSM) to one another over sidelink communications, where the BSMs can include information from the vehicle, such as position, motion parameters, braking parameters, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, an apparatus for wireless communication is provided that includes a transceiver, a memory configured to store instructions, and one or more processors communicatively coupled with the memory and the transceiver. The one or more processors are configured to execute the instructions to cause the apparatus to detect, for a first vehicle, presence of an obstacle in a driving path of a vehicle, determine, for a second vehicle, a sight stopping distance between the second vehicle and the obstacle, and transmit, to the second vehicle and where the sight stopping distance is within a threshold, a message including a notification of the obstacle.

In another example, a method of wireless communication is provided. The method includes detecting, for a first vehicle, presence of an obstacle in a driving path of a vehicle, determining, for a second vehicle, a sight stopping distance between the second vehicle and the obstacle, and transmitting, to the second vehicle and where the sight stopping distance is within a threshold, a message including a notification of the obstacle.

In another example, an apparatus for wireless communication of V2X messages is provided. The apparatus includes means for detecting, for a first vehicle, presence of an obstacle in a driving path of a vehicle, means for determining, for a second vehicle, a sight stopping distance between the second vehicle and the obstacle, and means for transmitting, to the second vehicle and where the sight stopping distance is within a threshold, a message including a notification of the obstacle.

In another example, a computer-readable medium is provided that includes code executable by one or more processors for wireless communications of V2X messages. The code includes code for detecting, for a first vehicle, presence of an obstacle in a driving path of a vehicle, determining, for a second vehicle, a sight stopping distance between the second vehicle and the obstacle, and transmitting, to the second vehicle and where the sight stopping distance is within a threshold, a message including a notification of the obstacle.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to sharing sensor-related messages among devices using sidelink communications. For example, in fifth generation (5G) new radio (NR), vehicle-based user equipment (UE) can communicate with one another using sidelink communications, which can include vehicle-to-vehicle (V2V) communications, vehicle-to-infrastructure (V2I) communications, etc., which can be collectively referred to as vehicle-to-anything (V2X) communications. Sidelink communications, in this regard, can occur among the nearby UEs without traversing a base station or other network nodes, though in some examples a base station can manage and provide resources for the sidelink communications. V2X communications can include basic safety messages (BSMs), which can include vehicle information such as position (e.g., global positioning system (GPS) position), motion parameters (e.g., velocity, acceleration, etc.), braking parameters, and/or the like for a vehicle transmitting the BSM. Other vehicles can receive the BSM(s) from transmitting vehicles and can determine or apply parameters received in the BSMs for certain purposes, such as to notify a driver of the vehicle receiving the BSM of a safety issue presented by, or discerned from, the BSM of another vehicle.

Application-layer standards are being defined for advanced V2X features including sensor-sharing (e.g., dissemination of detected vehicles and/or objects) and coordinated driving (e.g., sharing and negotiating intended maneuvers). Messages including parameters to enable these features can be exchanged between vehicles or between vehicles and infrastructure components, or Roadside Units (RSUs). Sensor-sharing can assist in coordinated driving, in an example, as all vehicles participating in a maneuver can have knowledge of road conditions and environment in the vicinity of the planned maneuver through their own sensors, and via sensor-sharing information received from other participating vehicles. As such, reliable sensor-sharing can improve coordinated driving. 5G NR V2X has introduced application-aware, distance-based high reliability for groupcast communication, enabling enhanced reliability at the physical layer as a function of range (e.g., or distance).

For sensor sharing data to be useful to a receiving vehicle, the receiving vehicle may benefit from receiving the data such that the receiving vehicle has sufficient time to react to the information. For example, if the information received in a sensor-related message includes an obstacle in the road, the vehicles receiving the message can benefit from receiving the data with sufficient time to invoke maneuvers. The required reaction time for a vehicle to react to an object can be specified as a reaction distance, or range, to the detected object information included in the message. 5G NR V2X currently defines a mechanism to enforce high-reliability transmission for groups of participants, based on specification of a range for a specific V2X service. However, there is no mechanism defined in 5G or at the application layer for the sender of a message to determine the appropriate distance which the physical layer should use to enforce high-reliability transmission. In aspects described herein, vehicles can communicate sensor-related messages to one another as well, such to warn of an obstacle in a driving path. For example, a vehicle can transmit a sensor-related message to other nearby vehicles using sidelink communications, where the sensor-related message may indicate existence of an obstacle in a driving path.

In some aspects described herein, a vehicle that detects the obstacle (also referred to herein as the "ego vehicle") can determine a sight stopping distance (SSD) of one or more nearby receiving vehicles, which are able to receive messages from the ego vehicle. In an example, the ego vehicle can determine the SSD based on information received in BSMs from the one or more nearby receiving vehicles. The ego vehicle can determine to transmit a message notifying of the obstacle to receiving vehicles having a SSD that is determined to be within a threshold distance of the obstacle. For example, the ego vehicle can compute the SSD based on one or more of the motion parameters (e.g., oncoming speed) indicated for the one or more receiving vehicles, a road condition determined by the ego vehicle or indicated by the one or more receiving vehicles (e.g., weather related conditions), an internal vehicle condition reported by the one or more receiving vehicles (e.g., brake status), a speed of the obstacle, and/or the like.

Using such parameters to determine the SSD of the vehicle can allow for determining an appropriate range for enforcing 5G NR distance-based reliability of transmitting the messages, and the ego vehicle can accordingly transmit the messages to comply with the distance-based reliability. This can improve driving safety for both human-driving and autonomously-driven vehicles by providing advanced notice of obstacles to nearby vehicles to allow drivers (or autonomous driving systems) to take action based on notification of the obstacles. In an example, a rule set for enforcing a reliability range for the messages can be as standardized in application-layer standards in groups including Society of Automotive Engineers (SAE), European Telecommunications Standards Institute (ETSI)-Intelligent Transport Systems (ITS), China-SAE (C-SAE), etc. In SAE, for example, an application-layer standard for such messages can include the J3224 Sensor Sharing Message standard.

The described features will be presented in more detail below with reference to FIGS. 1-5.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
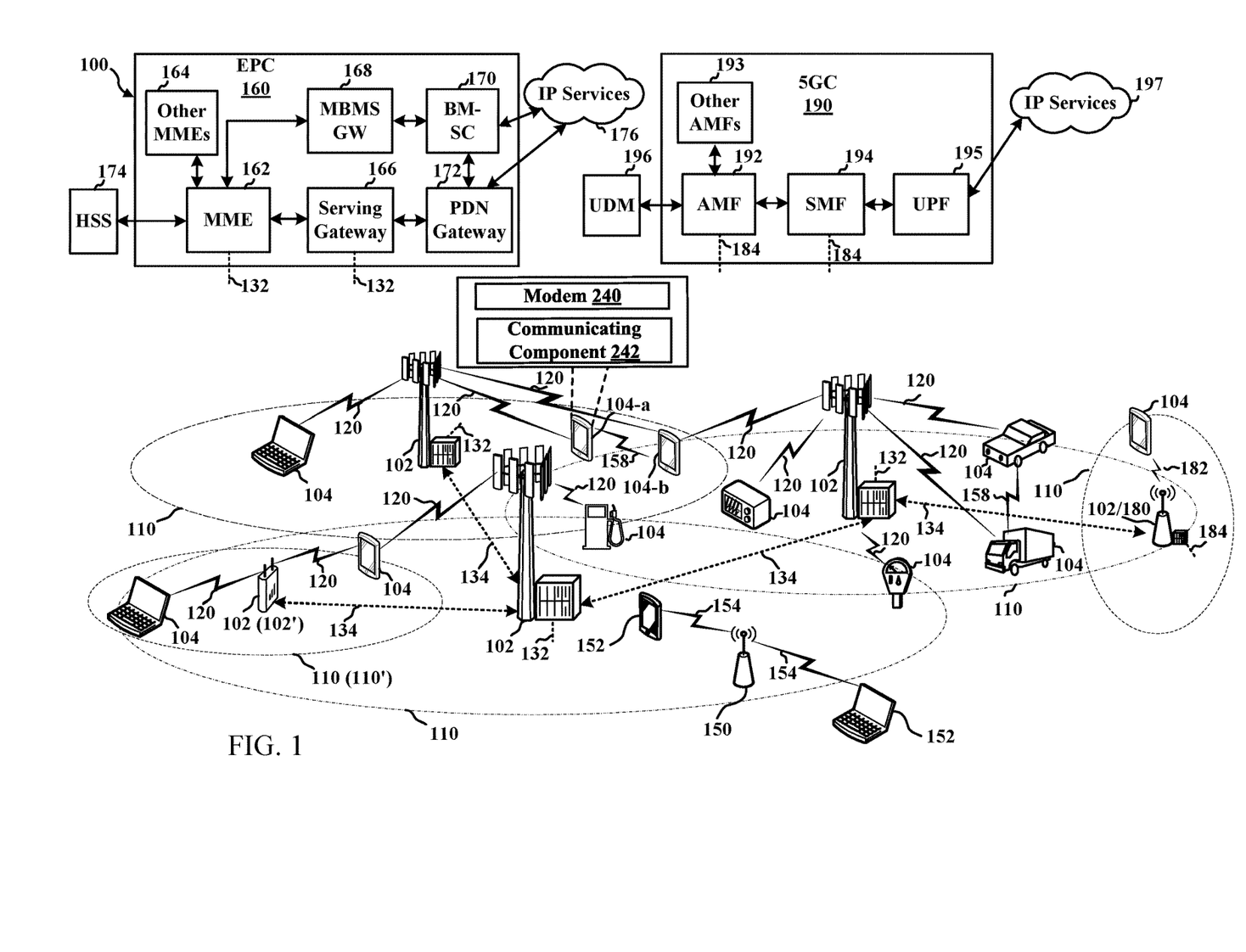
FIG. 1 illustrates an example of a wireless communication system, in accordance with various aspects of the present disclosure.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting sensor-related messages to other UEs 104 over sidelink communications, as described herein. Though a UE 104 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat MD UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104-a (and/or other UEs) can detect obstacles in a driving path or area using one or more vehicle sensors and can transmit associated messages to nearby UEs (e.g., UE 104-b) over a sidelink (e.g., D2D communication link 158). Communicating component 242 can determine whether to transmit the message to a given UE based on a SSD determined for the given UE, where the SSD can be computed based on various parameters related to the vehicle that hosts the given UE, parameters related to the obstacle, road condition parameters, etc., as described further herein. In another example, communicating component 242 can additionally determine whether to transmit the message to the given UE based on one or more of a location of the obstacle with respect to the given UE.

Figure 2:
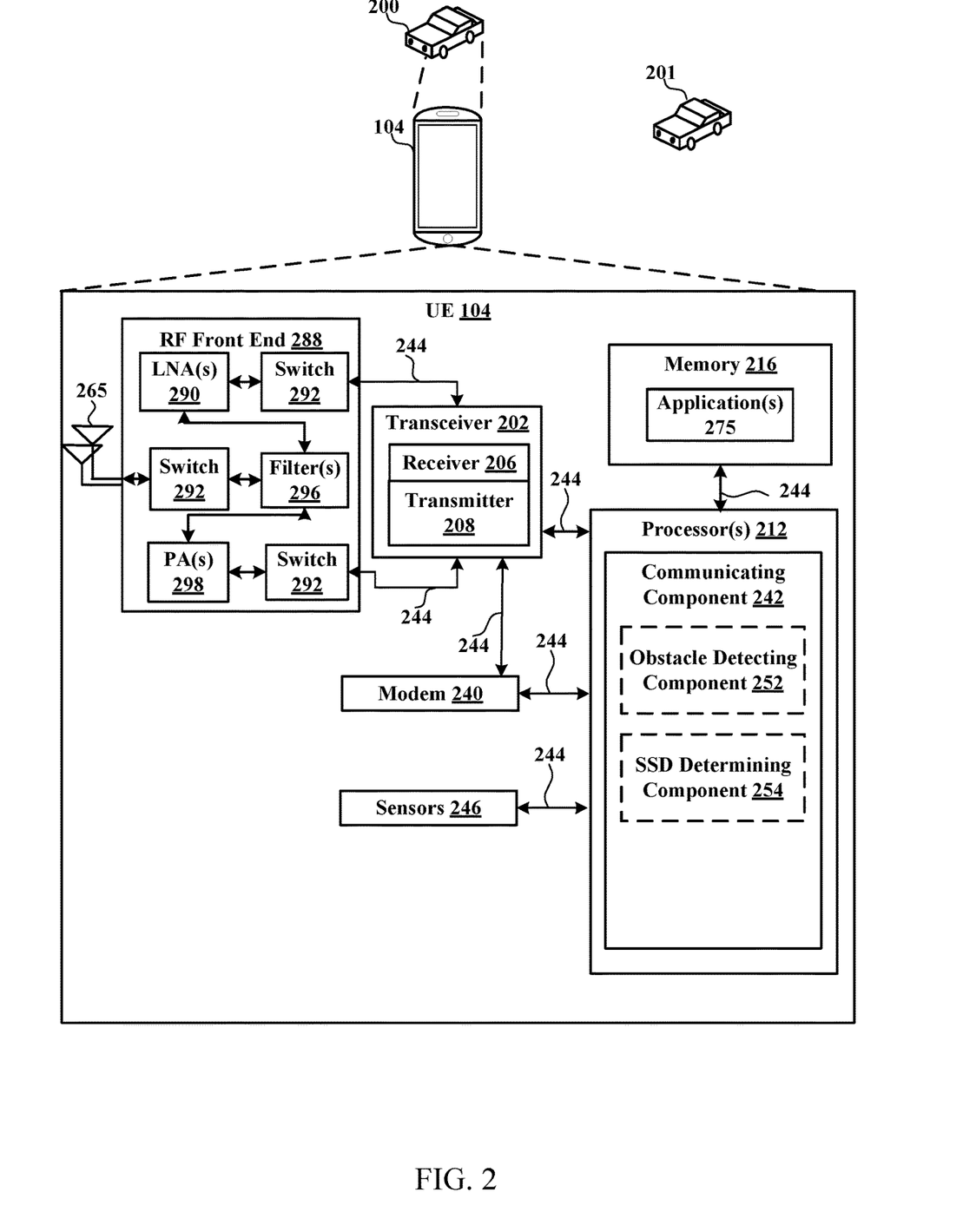
FIG. 2 is a block diagram illustrating an example of a UE, in accordance with various aspects of the present disclosure.
Figure 3:
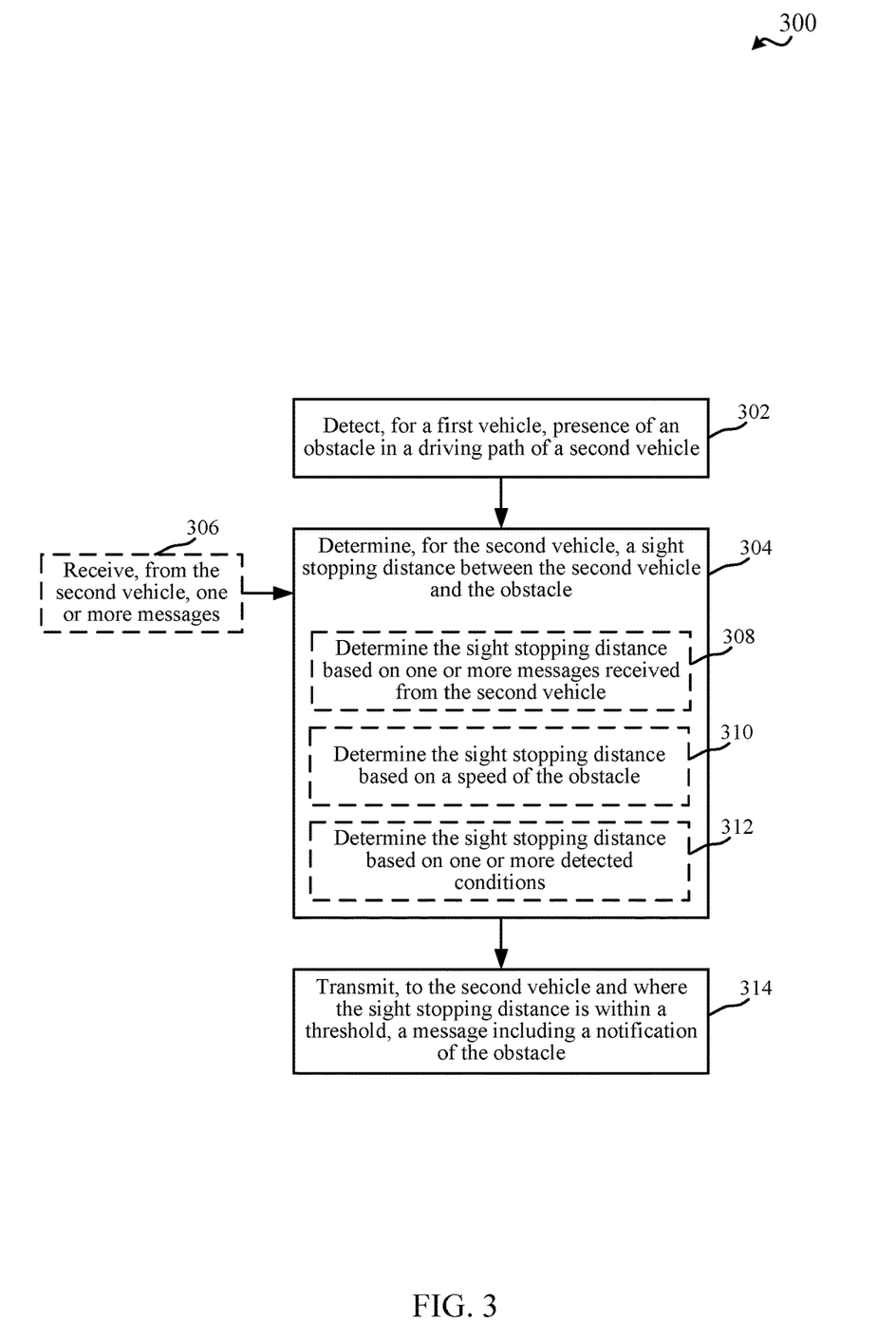
FIG. 3 is a flow chart illustrating an example of a method for transmitting sensor-related messages, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting sensor-related messages to other UEs 104 over sidelink communications, as described herein. UE 104 can be hosted by, implemented within, etc. a vehicle 200 for facilitating V2X communications, such as V2V communications with other vehicles, such as receiving vehicle 201.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102 or another UE. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, receiving wireless communications transmitted by at least one base station 102 or another UE, or transmitting wireless communications by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102 or one or more other UEs (e.g., in D2D, sidelink, or V2X communications). In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

UE 104 can also include or be operatively coupled to one or more sensors 246. Though shown as within the UE 104, the sensors 246 may be physically mounted on the vehicle 200 to detect obstacles or other conditions, and may be communicatively coupled with the UE 104 to provide information thereto. For example, the one or more sensors 246 may include proximity sensors to detect obstacles within a proximity of an area or surface of the vehicle 200, velocity sensors to detect velocity of an obstacle with respect to the vehicle 200 where the obstacle is in motion, etc. The sensors 246 and/or a corresponding processor can provide the obstacle information to the UE 104 or a component thereof (e.g., processor 212) at various times, such as based on detecting the obstacle, as a periodic notification of any obstacles detected within a time period, etc.

In an aspect, communicating component 242 can optionally include an obstacle detecting component 252 for detecting obstacles in a driving path or area based on information received from one or more sensors 246 that are configured to detect obstacles, and/or a SSD determining component 254 for determining a SSD of a receiving vehicle (e.g., receiving vehicle 201) as related to the obstacle, as described herein.

In an aspect, the processor(s) 212 may correspond to one or more of the processors described in connection with the UE in FIG. 5. Similarly, the memory 216 may correspond to the memory described in connection with the UE in FIG. 5.

FIG. 3 illustrates a flow chart of an example of a method 300 for transmitting sensor-related messages based on a determined SSD of receiver vehicles. In an example, a UE (e.g., UE 104-*a*) can perform the functions described in method 300 using one or more of the components described in FIGS. 1 and 2.

In method 300, at Block 302, presence of an obstacle can be detected, for a first vehicle, as being in a driving path of a second vehicle. In an aspect, obstacle detecting component 252, e.g., in conjunction with processor(s) 212, memory 216, transceiver 202, communicating component 242, sensors 246, etc., can detect, for the first vehicle (e.g., vehicle 200), presence of the obstacle in the driving path of the second vehicle (e.g., vehicle 201). For example, sensors 246 can be positioned around the vehicle 200 for detecting obstacles based on proximity, velocity, etc. In an example, the sensors 246, e.g., via processor 212 or other processors in the vehicle 200 or UE 104, can provide obstacle information to the obstacle detecting component 252. For example, the obstacle information can include a distance to the obstacle from the sensors 246 (e.g., as measured by the sensors 246), a speed, acceleration, etc. of the obstacle as measured by the sensors 246 (e.g., where the obstacle is in motion), and/or the like. In an example, obstacle detecting component 252 can detect the obstacle based on the obstacle information received from the sensors 246, such as notification of the potential obstacle, determination that the obstacle may warrant notification based on an identification of the obstacle (e.g., identifying the object type, such as another vehicle, a person, etc.), a distance to the obstacle, speed or travel direction of the obstacle, etc.

In method 300, at Block 304, a SSD between the second vehicle and the obstacle can be determined for the second vehicle. In an aspect, SSD determining component 254, e.g., in conjunction with processor(s) 212, memory 216, transceiver 202, communicating component 242, sensors 246, etc., can determine, for the second vehicle, the SSD between the second vehicle and the obstacle. For example, SSD determining component 254 can determine the SSD based on various parameters related to the second vehicle (e.g., the receiver vehicle 201), the obstacle, the first vehicle (e.g., the ego vehicle 200), etc.

In an example, at least for human-drive vehicles, SSD can be defined as the distance required for a vehicle to stop for a stationary object in its path. Expressions for this distance can be as a function of road grade, human perception time, and vehicle braking time. SSD can be a function of the vehicle speed, road grade, driver reaction time, etc. and/or may be based on one or more formulas. An example formula may include the following:

$$SSD = \begin{bmatrix} \text{Distance travelled from time object} \\ \text{detected to application of brakes} \end{bmatrix} + \begin{bmatrix} \text{Distance need to stop vehicle} \\ \text{from instant brames applied} \end{bmatrix}$$

$$SSD = [\text{Brake reaction distance}] + [\text{Braking distance}]$$

$$SSD = 1.47\, Vt + 1.075\, \frac{V^2}{a}$$

where V is vehicle speed (e.g., in miles per hour (mph)), t is perception reaction time (PRT), which can be 2.5 seconds in one example, and a is deceleration rate, which can be 11.2 feet per second (ft/s), in one example. Thus, for example, SSD can be based on the speed of the affected vehicle. For sensor sharing, a relevant speed may be the speed of the vehicle receiving the sensor-related message (e.g., and not necessarily the sped of the vehicle sending the message). The speed of vehicles receiving such messages (e.g., vehicle 201), as described, may be available to, or otherwise discernable by, the vehicle sending the messages (e.g., vehicle 200) from the basic safety messages (BSM) transmitted by the receiving vehicles (e.g., vehicle 201). Though BSMs are referred to herein, similar concepts can be applied using other messages communicated between vehicles based on one or more of various standards or communication technologies. For example, such other messages may include cooperative awareness messages (CAMs).

In one example, optionally at Block 306, one or more messages can be received from the second vehicle. In an aspect, communicating component 242, e.g., in conjunction with processor(s) 212, memory 216, transceiver 202, etc., can receive, from the second vehicle, the one or more messages. For example, the one or more messages may include BSMs transmitted by the second vehicle, as described above, which can include information related to the position (e.g., GPS position) of the second vehicle, motion (e.g., speed, acceleration, direction, etc.) of the second vehicle, other internal vehicle condition parameters, such as braking parameters, tire pressure parameters, and/or the like, detected road condition parameters, etc., of the second vehicle.

In an example, in determining the SSD at Block 304, optionally at Block 308, the SSD can be determined based on one or more messages received from the second vehicle. In an aspect, SSD determining component 254, e.g., in conjunction with processor(s) 212, memory 216, transceiver 202, communicating component 242, etc., can determine the SSD based on the one or more message received from the second vehicle (e.g., the receiver vehicle 201), which may include one or more BSMs. For example, the one or more BSMs can indicate maximum speed of the oncoming vehicles (e.g., the second vehicle(s)), $V_{BSM, MAX}$, or one or more parameters for determining the maximum speed. In an example, SSD determining component 254 can determine the SSD for the second vehicle (e.g., receiver vehicle 201) based on the indicated maximum speed using a formula similar to the following:

$$SSD = 1.47(V_{BSM,MAX})t + 1.075\frac{(V_{BSM,MAX})^2}{a}$$

Figure 4:
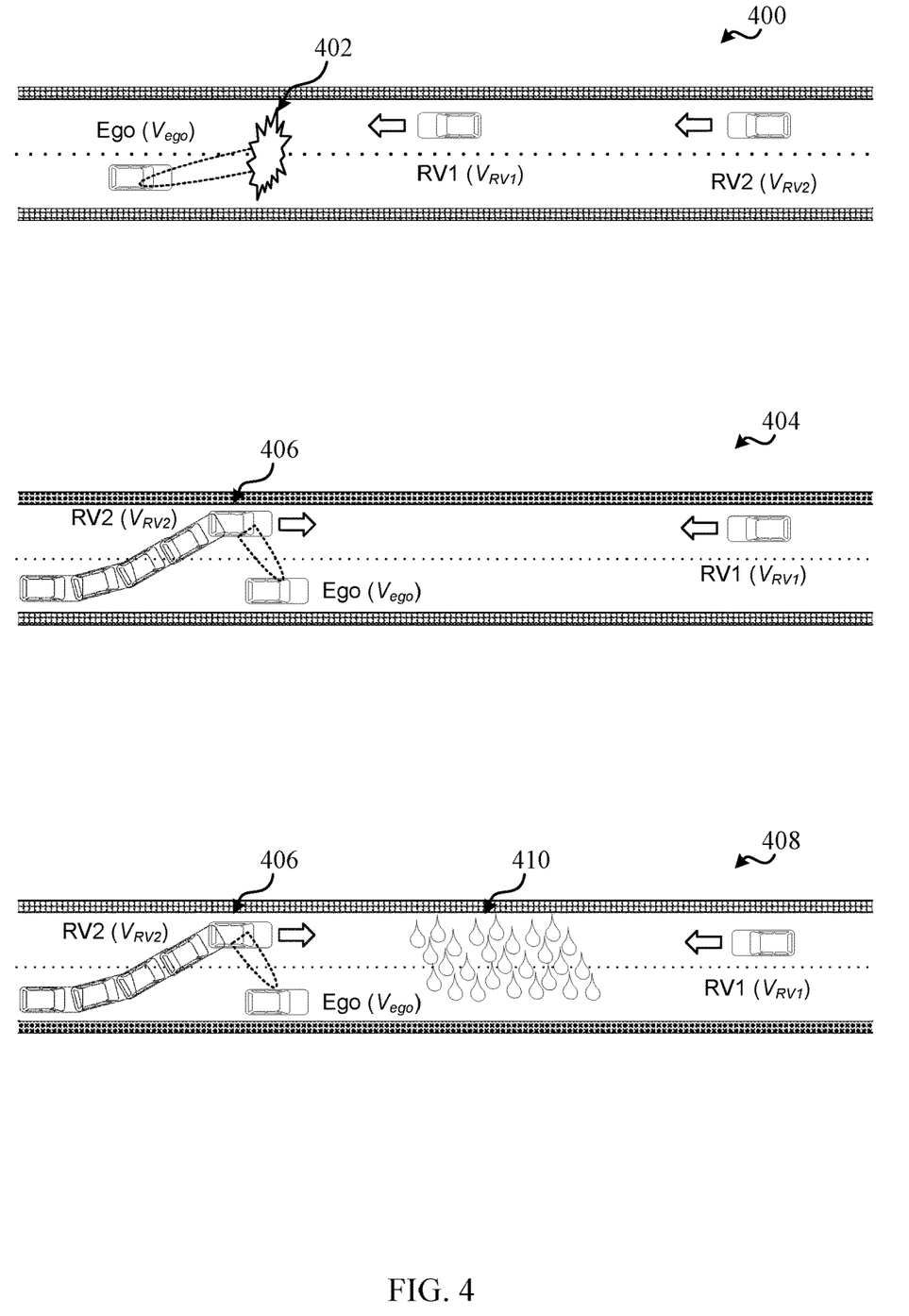
FIG. 4 illustrates an example of driving scenarios, in accordance with various aspects of the present disclosure.

An example is shown in FIG. 4, which illustrates a driving scenario 400 having an ego vehicle ($V_{EGO}$) that detects an obstacle 402 in the driving path or area of the ego vehicle. For example, the ego vehicle can detect the obstacle 402 based on input from one or more sensors on the ego vehicle, as described above, or from sensor data that may be received from other vehicles, infrastructure, etc., in V2X communications. In an example, the ego vehicle can also detect receiving vehicles RV1, RV2 based on their BSM transmissions. The ego vehicle can create a sensor-related message to indicate existence of the obstacle, and/or can determine a message range for transmitting the sensor-related message to receiver vehicles within the message range. For example, ego vehicle can determine the message range as SSD using the maximum of the received velocities from RV1, RV2 (e.g., max($V_{RV1}$, $V_{RV2}$)), e.g., which may be used as $V_{BSM, MAX}$ in the above formula.

In an example, in determining the SSD at Block 304, optionally at Block 310, the SSD can be determined based on a speed of the obstacle. In an aspect, SSD determining component 254, e.g., in conjunction with processor(s) 212, memory 216, transceiver 202, communicating component 242, etc., can determine the SSD based on speed of the obstacle. For example, SSD determining component 254 can determine the speed of the obstacle based on input from one or more sensors 246, as described. For example, the one or more sensors 246 can detect and report, to SSD determining component 254, to speed of the obstacle. In another example, the one or more sensors 246 can report, to SSD determining component 254, a position or location of the obstacle over multiple time periods, from which SSD determining component 254 can determine a detected proximity over the multiple time periods and thus a speed of the obstacle. In another example, the one or more sensors 246 can include velocity sensors that can determine and report a velocity of the obstacle. In yet another example, one or more other vehicles, infrastructure devices, etc., can report the speed of the obstacle (e.g., in BSMs or other messages) to SSD determining component 254. In yet another example, the obstacle can be a vehicle or other object that can transmit, to SSD determining component 254, BSMs indicating the speed of the obstacle and/or parameters from which the speed can be determined (e.g., position or location at certain points in time), etc.

In an example, SSD determining component 254 can determine the SSD for the second vehicle (e.g., receiver vehicle 201) based on the speed of the second vehicle and the speed of the obstacle ($V_{HAZARD}$) using a formula similar to the following:

$$SSD = 1.47(V_{HAZARD} + V_{BSM,MAX})t + 1.075\frac{(V_{HAZARD} + V_{BSM,MAX})^2}{a}$$

An example is shown in FIG. 4, which illustrates a driving scenario 404 having an ego vehicle ($V_{EGO}$) that detects an obstacle 406, which can be another vehicle (RV2) in the driving path or area of the ego vehicle. For example, the ego vehicle can detect the obstacle 406 (RV2), and/or speed thereof ($V_{HAZARD}$), based on input from one or more sensors on the ego vehicle, BSMs received from the obstacle (where the obstacle is a vehicle), etc., as described above. In another example, the ego vehicle can also detect receiving vehicle RV1 based on its BSM transmissions. In an example, based on detecting the obstacle (RV1), the speed of the obstacle (RV1), the speed of the other vehicle (RV2), the computed SSD, etc., the ego vehicle can create a sensor-related message to indicate existence of the obstacle, and/or can determine a message range for transmitting the sensor-related message to receiver vehicles within the message range. For example, ego vehicle can determine the message range as SSD using the sum of the received velocities from receiving vehicle RV1, and the obstacle RV2 (e.g., $V_{RV1}+V_{RV2}$) (e.g., as $V_{BSM,MAX}$ in the above formula).

In an example, in determining the SSD at Block 304, optionally at Block 312, the SSD can be determined based on one or more detected conditions. In an aspect, SSD determining component 254, e.g., in conjunction with processor(s) 212, memory 216, transceiver 202, communicating component 242, etc., can determine the SSD based on one or more detected conditions. For example, the one or more detected conditions can include conditions detected by the first vehicle (e.g., vehicle 200), conditions detected by the second vehicle (e.g., vehicle 201), which can be communicated to the first vehicle (e.g., in BSMs), and/or the like. The detected conditions, for example, can include detected road conditions, such as weather conditions (e.g., precipitation, wind, road friction, etc.). As described, for example, the detected road conditions can be determined by sensors 246 on the vehicle, received in messages from the receiver vehicles (e.g., in application-layer messages), and/or the like. In another example, the detected conditions can include internal vehicle conditions of the receiver vehicles (e.g., brake status, tire pressure, etc.), or other conditions detected by vehicle 200 or received in messages from the receiver vehicles. In any case, the detected road or vehicle conditions can affect the effective SSD of the vehicle. Thus, in one example, SSD determining component 254 can adjust the SSD by an explicit margin based on one or more detected road or vehicle conditions. For example, SSD determining component 254 can adjust the SSD by increasing PRT, t, or both (in the above formulas).

In an example, SSD determining component 254 can determine the detected conditions based on wiper status, road friction, rain sensor information, etc. detected at the first vehicle (vehicle 200) and/or the second vehicle (receiver vehicle 201). As described, where the conditions are detected by the second vehicle (e.g., receiver vehicle 201), the second vehicle can send one or more messages to the first vehicle (e.g., vehicle 200) notifying of the conditions or related parameters. In another example, SSD determining component 254 can determine the detected conditions based on brake status information (e.g., anti-lock brake system status, stability control status, traction control status, etc.), tire status information (e.g., tire pressure, which can be as a function of indicated tire temperature or otherwise, tire leakage rate, wheel status, etc.) of the first vehicle (e.g., vehicle 200) or as received from the second vehicle (e.g., receiver vehicle 201). In any case, for example, different detected conditions and/or associated condition values can have an associated SSD adjustment, which SSD determining component 254 can determine based on the detected conditions or associated values and/or apply in determining the SSD (e.g., by summing the SSD adjustments to determine ΔSSD).

In an example, SSD determining component 254 can determine the SSD for the second vehicle (e.g., receiver vehicle 201) based on the speed of the second vehicle and/or the speed of the obstacle ($V_{HAZARD}$) and/or by adjusting the SSD (by ΔSSD) to account for detected conditions using a formula similar to the following:

$$SSD = 1.47(V_{HAZARD} + V_{BSM,MAX})t + 1.075\frac{(V_{HAZARD} + V_{BSM,MAX})^2}{a} + \Delta SSD$$

An example is shown in FIG. 4, which illustrates a driving scenario 408 having an ego vehicle ($V_{EGO}$) that detects an obstacle 406, which can be another vehicle (RV2) in the driving path or area of the ego vehicle. For example, the ego vehicle can detect the obstacle 406 (RV2), and/or speed thereof ($V_{HAZARD}$), based on input from one or more sensors on the ego vehicle, BSMs received from the obstacle (where the obstacle is a vehicle), etc., as described above. In an example, the ego vehicle can also detect receiving vehicle RV1 based on its BSM transmissions. In addition, for example, the ego vehicle can also detect one or more conditions, such as rain 410, which can be based on information from sensors on the ego vehicle, messages received from one or more receiver vehicles, etc. The ego vehicle can create a sensor-related message to indicate existence of the obstacle, and/or can determine a message range for transmitting the sensor-related message to receiver vehicles within the message range. For example, ego vehicle can determine the message range as SSD using the sum of the received velocities from receiving vehicle RV1, and the obstacle RV2 (e.g., $V_{RV1}+V_{RV2}$) (e.g., in the above formula). In this regard, for example, the ego vehicle can adjust the SSD based on detected conditions (e.g., to provide a safety margin for the SSD).

In method 300, at Block 314, a message including a notification of the obstacle can be transmitted to the second vehicle and where the SSD is within a threshold. In an aspect, communicating component 242, e.g., in conjunction with processor(s) 212, memory 216, transceiver 202, etc., can transmit, to the second vehicle (e.g., receiver vehicle 201) and where the SSD is within the threshold, the message including the notification of the obstacle. For example, the message can be a sensor-related message, as described herein, to warn or notify of the obstacle. The message can include an indication of the obstacle and/or other obstacle information, such as location, distance, speed, size, classification (e.g., vehicle, stationary obstacle, etc.), parameters used to determine existence of the obstacle (e.g., road conditions), and/or the like. For example, the message can be another BSM, CAM, or other message communicated between vehicles over a sidelink. In addition, for example, the threshold can be a fixed value for all detected vehicles or can be different per vehicle, per vehicle type, per driving scenario, per location (e.g., per country, state, city, road, etc.), and/or the like. In another example, the threshold can be configured for the vehicle 200 by a base station or other network configuration, etc.

In an example, transmitting the message can include determining a message range for applying the message (e.g., based on the computed SSD for one or more vehicles). For example, the sensor-related message can be an application layer message transmitted to one or more receiving vehicles and can include (e.g., as a parameter) a message range for applying the message based on the SSD. As such, for example, receiving vehicles can receive the message (e.g., when within physical range to receive the message), and the receiving vehicles can determine whether to apply the message at a physical layer based on the intended message range indicated in the message. In this example, the message can be appropriately delivered to receiving vehicles to allow the receiving vehicles to be notified of the obstacle. The receiving vehicles can take further action based on the notification, such to trigger avoidance (e.g., whether the vehicle is human-driven or autonomously-driven), or other display or usage of the notification.

Figure 5:
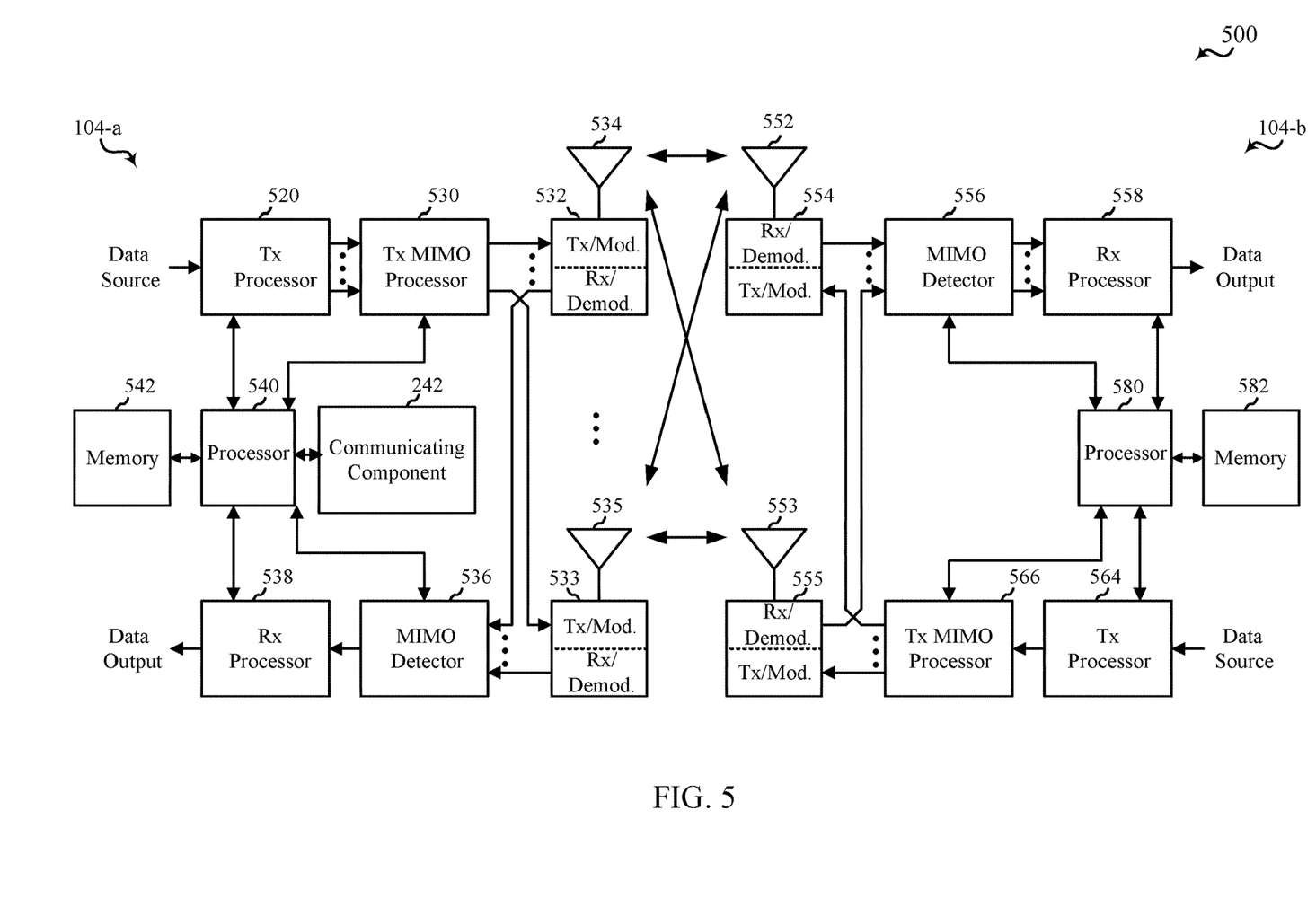
FIG. 5 is a block diagram illustrating an example of a MIMO communication system including a base station and a UE, in accordance with various aspects of the present disclosure.

FIG. 5 is a block diagram of a MIMO communication system 500 including UEs 104-*a*, 104-*b*. The MIMO communication system 500 may illustrate aspects of the wireless communication access network 100 described with reference to FIG. 1. The UE 104-*a* may be an example of aspects of the UE 104 described with reference to FIGS. 1-2. The UE 104-*a* may be equipped with antennas 534 and 535, and the UE 104-*b* may be equipped with antennas 552 and 553. In the MIMO communication system 500, the UEs 104-*a*, 104-*b* may be able to send data over multiple communication links at the same time. Each communication link may be called a "layer" and the "rank" of the communication link may indicate the number of layers used for communication. For example, in a 2×2 MIMO communication system where UE 104-*a* transmits two "layers," the rank of the communication link between the UE 104-*a* and the UE 104-*b* is two.

At the UE 104-*a*, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104-*b* may be an example of aspects of the UEs 104 described with reference to FIGS. 1-2. At the UE 104-*b*, the UE antennas 552 and 553 may receive the signals from the UE 104-*a* (e.g., over a sidelink) and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104-*b* to a data output, and provide decoded control information to a processor 580, or memory 582.

At the UE 104-*b*, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the UE 104-*a* in accordance with the communication parameters received from the UE 104-*a*. At the UE 104-*a*, the signals from the UE 104-*b* may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The processor 540 may in some cases execute stored instructions to instantiate a communicating component 242 (see e.g., FIGS. 1 and 2).

The components of the UEs 104-*a*, 104-*b* may, individually or collectively, be implemented with one or more ASICs adapted to perform some or all of the applicable functions in hardware. Each of the noted modules may be a means for performing one or more functions related to operation of the MIMO communication system 500. Similarly, the components of the UE 104-*a* may, individually or collectively, be implemented with one or more ASICs adapted to perform some or all of the applicable functions in hardware. Each of the noted components may be a means for performing one or more functions related to operation of the MIMO communication system 500.

The following aspects are illustrative only and aspects thereof may be combined with aspects of other embodiments or teaching described herein, without limitation.

Aspect 1 is a method for wireless communication of V2X messages including detecting, for a first vehicle, presence of an obstacle in a driving path of a vehicle, determining, for a second vehicle, a sight stopping distance between the second vehicle and the obstacle as being within a threshold, and transmitting, to the second vehicle and based on determining the sight stopping distance as being within the threshold, a message including a notification of the obstacle.

In Aspect 2, the method of Aspect 1 includes where determining the sight stopping distance is based at least in part on determining an oncoming speed of the second vehicle and a determined location of the obstacle.

In Aspect 3, the method of Aspect 2 includes receiving, from the second vehicle, a basic safety message indicating the oncoming speed of the second vehicle.

In Aspect 4, the method of any of Aspects 2 or 3 includes where determining the sight stopping distance is further based at least in part on a road condition.

In Aspect 5, the method of Aspect 4 includes receiving, from the second vehicle or another vehicle, an indication of the road condition.

In Aspect 6, the method of Aspect 5 includes where the road condition includes at least one of a weather condition or an internal vehicle condition.

In Aspect 7, the method of any of Aspects 4 to 6 includes detecting, based on input from a sensor of the first vehicle, the road condition.

In Aspect 8, the method of any of Aspects 2 to 7 includes where determining the sight stopping distance is further based at least in part on a detected speed of the obstacle.

In Aspect 9, the method of any of Aspects 1 to 8 includes where determining the sight stopping distance is based at least in part on determining an oncoming speed of the second vehicle and one or more other vehicles and a determined location of the obstacle.

In Aspect 10, the method of any of Aspects 1 to 9 includes where transmitting the message includes providing the sight stopping distance in the message for determining, based on the sight stopping distance, a distance-based reliability for transmitting the message.

In Aspect 11, the method of any of Aspects 1 to 10 includes where the sight stopping distance is received in the message and is provided to a physical layer for determining a distance-based reliability.

Aspect 12 is a method for wireless communication of V2X messages including detecting, for a first vehicle, presence of an obstacle in a driving path of a vehicle, determining, for a second vehicle, a sight stopping distance between the second vehicle and the obstacle, and transmitting, to the second vehicle and where the sight stopping distance is within a threshold, a message including a notification of the obstacle.

In Aspect 13, the method of Aspect 1 includes where determining the sight stopping distance is based at least in part on an oncoming speed of the second vehicle and a location of the obstacle.

In Aspect 14, the method of Aspect 13 includes receiving, from the second vehicle, a basic safety message indicating the oncoming speed of the second vehicle.

In Aspect 15, the method of any of Aspects 13 or 14 includes where determining the sight stopping distance is further based at least in part on a road condition.

In Aspect 16, the method of Aspect 15 includes receiving, from the second vehicle or another vehicle, an indication of the road condition.

In Aspect 17, the method of Aspect 16 includes where the road condition includes at least one of a weather condition or an internal vehicle condition.

In Aspect 18, the method of any of Aspects 15 to 17 includes detecting, based on input from a sensor of the first vehicle, the road condition.

In Aspect 19, the method of any of Aspects 13 to 18 includes where determining the sight stopping distance is further based at least in part on a detected speed of the obstacle.

In Aspect 20, the method of any of Aspects 12 to 19 includes where determining the sight stopping distance is based at least in part on an oncoming speed of the second vehicle and one or more other vehicles and a location of the obstacle.

In Aspect 21, the method of any of Aspects 12 to 20 includes where transmitting the message includes providing the sight stopping distance in the message to indicate, based on the sight stopping distance, a distance-based reliability for transmitting the message.

In Aspect 22, the method of any of Aspects 12 to 21 includes where the sight stopping distance is received in the message and is provided to a physical layer for indicating a distance-based reliability.

Aspect 23 is an apparatus for wireless communication including a transceiver, a memory configured to store instructions, and one or more processors communicatively coupled with the memory and the transceiver. The one or more processors are configured to perform one or more of the methods of any of Aspects 1 to 22.

Aspect 24 is an apparatus for wireless communication including means for performing one or more of the methods of any of Aspects 1 to 22.

Aspect 25 is a computer-readable medium including code executable by one or more processors for wireless communications, the code including code for performing one or more of the methods of any of Aspects 1 to 22.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
   detect, for a first vehicle, presence of an obstacle in a driving path of a second vehicle; and
   transmit, to the second vehicle, where the second vehicle is within a message range of the first vehicle, and where a sight stopping distance between the second vehicle and the obstacle is within a threshold, a message including a notification of the obstacle,
wherein the sight stopping distance is based at least in part on a detected speed of the obstacle, and
wherein the message range is a function of the sight stopping distance.

2. The apparatus of claim 1, wherein the the sight stopping distance is further based at least in part on an oncoming speed of the second vehicle and a location of the obstacle.

3. The apparatus of claim 2, wherein the one or more processors are further configured to execute the instructions to cause the apparatus to receive, from the second vehicle, a basic safety message indicating the oncoming speed of the second vehicle.

4. The apparatus of claim 2, wherein the sight stopping distance is further based at least in part on a road condition or an internal vehicle condition that indicates the road condition.

5. The apparatus of claim 4, wherein the one or more processors are further configured to execute the instructions to cause the apparatus to receive, from the second vehicle or another vehicle, an indication of the road condition or the internal vehicle condition.

6. The apparatus of claim 5, wherein the road condition includes a weather condition.

7. The apparatus of claim 4, wherein the one or more processors are further configured to execute the instructions to cause the apparatus to detect, based on input from a sensor of the first vehicle, the road condition.

8. The apparatus of claim 1, wherein the message range is also a function of an oncoming speed of the second vehicle and one or more other vehicles.

9. The apparatus of claim 1, wherein the one or more processors are configured to execute the instructions to cause the apparatus to transmit the message to include providing the sight stopping distance in the message to indicate, based on the sight stopping distance, a distance-based reliability for transmitting the message.

10. The apparatus of claim 1, wherein the sight stopping distance is received in the message and is provided to a physical layer for indicating a distance-based reliability.

11. A method for wireless communication of vehicle-to-anything (V2X) messages, comprising:
detecting, for a first vehicle, presence of an obstacle in a driving path of a second vehicle; and
transmitting, to the second vehicle, where the second vehicle is within a message range of the first vehicle, and where a sight stopping distance between the second vehicle and the obstacle is within a threshold, a message including a notification of the obstacle,
wherein the sight stopping distance is based at least in part on a detected speed of the obstacle, and
wherein the message range is a function of the sight stopping distance.

12. The method of claim 11, wherein the sight stopping distance is further based at least in part on an oncoming speed of the second vehicle and a location of the obstacle.

13. The method of claim 12, further comprising receiving, from the second vehicle, a basic safety message indicating the oncoming speed of the second vehicle.

14. The method of claim 12, wherein the sight stopping distance is further based at least in part on a road condition or an internal vehicle condition that indicates the road condition.

15. The method of claim 14, further comprising receiving, from the second vehicle or another vehicle, an indication of the road condition or the internal vehicle condition.

16. The method of claim 15, wherein the road condition includes a weather condition.

17. The method of claim 14, further comprising detecting, based on input from a sensor of the first vehicle, the road condition.

18. The method of claim 11, wherein the message range is also a function of an oncoming speed of the second vehicle and one or more other vehicles.

19. The method of claim 11, wherein transmitting the message includes providing the sight stopping distance in the message to indicate, based on the sight stopping distance, a distance-based reliability for transmitting the message.

20. The method of claim 11, wherein the sight stopping distance is received in the message and is provided to a physical layer for indicating a distance-based reliability.

21. An apparatus for wireless communication of vehicle-to-anything (V2X) messages, comprising:
means for detecting, for a first vehicle, presence of an obstacle in a driving path of a second vehicle; and
means for transmitting, to the second vehicle, where the second vehicle is within a message range of the first vehicle, and where a sight stopping distance between the second vehicle and the obstacle is within a threshold, a message including a notification of the obstacle,
wherein the sight stopping distance is based at least in part on a detected speed of the obstacle, and
wherein the message range is a function of the sight stopping distance.

22. The apparatus of claim 21, wherein the sight stopping distance is further based at least in part on an oncoming speed of the second vehicle and a location of the obstacle.

23. The apparatus of claim 22, further comprising means for receiving, from the second vehicle, a basic safety message indicating the oncoming speed of the second vehicle.

24. The apparatus of claim 22, wherein the sight stopping distance is further based at least in part on a road condition or an internal vehicle condition that indicates the road condition.

25. The apparatus of claim 24, further comprising means for receiving, from the second vehicle or another vehicle, an indication of the road condition or the internal vehicle condition.

26. A non-transitory computer-readable medium, comprising code executable by one or more processors for wireless communications of vehicle-to-anything (V2X) messages, the code comprising code for:
   detecting, for a first vehicle, presence of an obstacle in a driving path of a second vehicle;
   and
   transmitting, to the second vehicle, where the second vehicle is within a message range of the first vehicle, and where a sight stopping distance between the second vehicle and the obstacle is within a threshold, a message including a notification of the obstacle,
   wherein the sight stopping distance is based at least in part on a detected speed of the obstacle, and
   wherein the message range is a function of the sight stopping distance.

27. The non-transitory computer-readable medium of claim 26, wherein the sight stopping distance is further based at least in part on an oncoming speed of the second vehicle and a location of the obstacle.

28. The non-transitory computer-readable medium of claim 27, further comprising code for receiving, from the second vehicle, a basic safety message indicating the oncoming speed of the second vehicle.

29. The non-transitory computer-readable medium of claim 27, wherein the sight stopping distance is further based at least in part on a road condition or an internal vehicle condition that indicates the road condition.

30. The non-transitory computer-readable medium of claim 29, further comprising code for receiving, from the second vehicle or another vehicle, an indication of the road condition or the internal vehicle condition.

* * * * *